United States Patent
Sasson et al.

(10) Patent No.: US 12,045,173 B2
(45) Date of Patent: Jul. 23, 2024

(54) STALE DATA RECOVERY USING VIRTUAL STORAGE METADATA

(71) Applicant: International Business Machines Corporation, Armonk, NY (US)

(72) Inventors: Ben Sasson, North Baddesley (GB); Gordon Douglas Hutchison, Eastleigh (GB); Lee Jason Sanders, Chichester (GB); Gareth Paul Jones, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/852,443

(22) Filed: Apr. 18, 2020

(65) Prior Publication Data
US 2021/0326271 A1    Oct. 21, 2021

(51) Int. Cl.
*G06F 12/00*    (2006.01)
*G06F 12/123*   (2016.01)

(52) U.S. Cl.
CPC .... *G06F 12/123* (2013.01); *G06F 2212/1044* (2013.01)

(58) Field of Classification Search
CPC ............ G06F 12/123; G06F 2212/1044
See application file for complete search history.

(56) References Cited

U.S. PATENT DOCUMENTS

| | | | | |
|---|---|---|---|---|
| 6,516,320 B1 * | 2/2003 | Odom | ............ | G06F 16/902 |
| | | | | 707/999.1 |
| 8,260,744 B1 * | 9/2012 | Chatterjee | ......... | G06F 11/1451 |
| | | | | 707/639 |
| 8,713,252 B1 * | 4/2014 | de la Iglesia | ........ | G06F 13/28 |
| | | | | 710/52 |
| 9,917,597 B1 * | 3/2018 | Cutter | ............. | H03M 7/6029 |
| 10,255,137 B1 | 4/2019 | Panidis | | |
| 10,437,783 B1 | 10/2019 | Cohen | | |

(Continued)

OTHER PUBLICATIONS

A Comprehensive Study of the Past, Present, and Future of Data Deduplication, Xia et al., Proceedings of the IEEE | vol. 104, No. 9, Sep. 2016. (Year: 2026).*

(Continued)

*Primary Examiner* — David Yi
*Assistant Examiner* — Tahilba O Puche
(74) *Attorney, Agent, or Firm* — Gavin Giraud

(57) ABSTRACT

Aspects of the present invention disclose a method, computer program product, and system for stale data recovery using virtual storage metadata. The method includes one or more processors generating a primary virtual storage metadata structure having virtual address areas for a data chunk. Each area includes a plurality of most recent updates of metadata for the data chunk. The metadata of each update includes a sequence number for the update and a pointer to the physical location of the data. The method further includes one or more processors generating an overflow virtual storage metadata structure for multiple virtual address areas. The overflow metadata structure includes updates that have overflowed from the virtual address areas. In addition, wherein an oldest update in a full virtual address area of the primary virtual storage metadata structure includes a link to an overflow location.

20 Claims, 10 Drawing Sheets

(56) References Cited

U.S. PATENT DOCUMENTS

| | | | |
|---|---|---|---|
| 11,726,696 B2* | 8/2023 | Nehra | G06F 11/1464 |
| | | | 711/162 |
| 2001/0011321 A1* | 8/2001 | Tamatsu | G06F 16/22 |
| | | | 707/E17.037 |
| 2003/0004980 A1* | 1/2003 | Kishi | G06F 11/1458 |
| | | | 714/E11.12 |
| 2003/0177109 A1* | 9/2003 | Cabrera | G06F 16/2365 |
| 2004/0073747 A1* | 4/2004 | Lu | G06F 11/1096 |
| | | | 714/E11.034 |
| 2008/0301386 A1* | 12/2008 | Matsui | G06F 11/2064 |
| | | | 711/E12.103 |
| 2009/0210462 A1* | 8/2009 | Arakawa | G06F 11/1458 |
| 2011/0271048 A1* | 11/2011 | Fuji | G06F 11/1441 |
| | | | 711/E12.019 |
| 2012/0079222 A1* | 3/2012 | Phelps | G06F 11/2074 |
| | | | 711/E12.001 |
| 2012/0257626 A1* | 10/2012 | McGhee | H04L 43/028 |
| | | | 370/392 |
| 2013/0311721 A1* | 11/2013 | Yoshihara | G06F 11/2028 |
| | | | 711/122 |
| 2014/0115232 A1 | 4/2014 | Goss | |
| 2015/0052320 A1* | 2/2015 | Peretz | G06F 11/1461 |
| | | | 711/162 |
| 2017/0109056 A1* | 4/2017 | Gopal | G06F 3/0656 |
| 2017/0286003 A1* | 10/2017 | Sala | G06F 3/065 |
| 2017/0286010 A1* | 10/2017 | Jiang | G06F 3/0652 |
| 2017/0308473 A1* | 10/2017 | Bassi | G06F 3/0665 |
| 2018/0039443 A1* | 2/2018 | Zheng | G06F 3/0683 |
| 2019/0310968 A1 | 10/2019 | Attarde | |
| 2020/0285410 A1* | 9/2020 | George | G06F 3/0644 |
| 2021/0081432 A1* | 3/2021 | Grunwald | G06F 16/273 |
| 2021/0224236 A1* | 7/2021 | Wang | G06F 16/2272 |

OTHER PUBLICATIONS

OverFlow: Multi-Site Aware Big Data Management for Scientific Workflows on Clouds. Radu Tudoran, Alexandru Costan, and Gabriel Antoniu, 2015 IEEE. (Year: 2015).*

Mell et al., "The NIST Definition of Cloud Computing", Recommendations of the National Institute of Standards and Technology, Special Publication 800-145, Sep. 2011, 7 pages.

* cited by examiner

STALE DATA RECOVERY USING VIRTUAL STORAGE METADATA

BACKGROUND OF THE INVENTION

The present invention relates generally to the field of virtual storage systems, and more particularly to data recovery using virtual storage metadata.

There is ever increasing demand to store more user data with the same physical capacity, which reduces the overall cost of ownership of the storage system. Data deduplication works by identifying repeated data patterns and instead of storing the user data repeatedly, creating a reference to the duplicate data that is stored elsewhere in the system. The reference may be that the existing duplicate is within the same volume or in another volume, either in the same pool or in another pool within the storage system or in a volume used by another host.

An example use case for data duplication is a virtual machine operating system image that is used by multiple hosts. In this example, the host operating system used by the multiple hosts may well be the same version; and therefore, storing N copies of the operating system data may be wasteful.

When being stored, user data is broken down into chunks. The storage system uses metadata to describe a virtual to physical mapping to the user data chunks. A common approach is to use a B-Tree type structure to describe this mapping. The original user data chunks are called the source chunks and leaves in the tree point to the source chunks. Other tree leaves that have been identified as deduplicated data are called referrers, which can be simply links to the source chunks.

A log structured array (LSA) is commonly used to store the user data chunks on the storage. The benefits of a log structured array are that data written by the user randomly across the virtual address space is written sequentially on the physical storage.

Deduplication metadata is accessed frequently and is often cached. In the event of a cache loss scenario, metadata can become lost/corrupt which means some part of the virtual volume space can also become lost. Storage systems implement versioning and journaling of the forward metadata, which enables recovery to be performed to restore the metadata by copying back the snapshotted metadata and replaying the journal to restore the integrity of the LSA.

SUMMARY

Aspects of the present invention disclose a method, computer program product, and system for stale data recovery using virtual storage metadata. The method includes one or more processors generating a primary virtual storage metadata structure having virtual address areas for a data chunk. Each area includes a plurality of most recent updates of metadata for the data chunk. The metadata of each update includes a sequence number for the update and a pointer to the physical location of the data. The method further includes one or more processors generating an overflow virtual storage metadata structure for multiple virtual address areas. The overflow metadata structure includes updates that have overflowed from the virtual address areas. In addition, wherein an oldest update in a full virtual address area of the primary virtual storage metadata structure includes a link to an overflow location.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings.

Figure 1A:
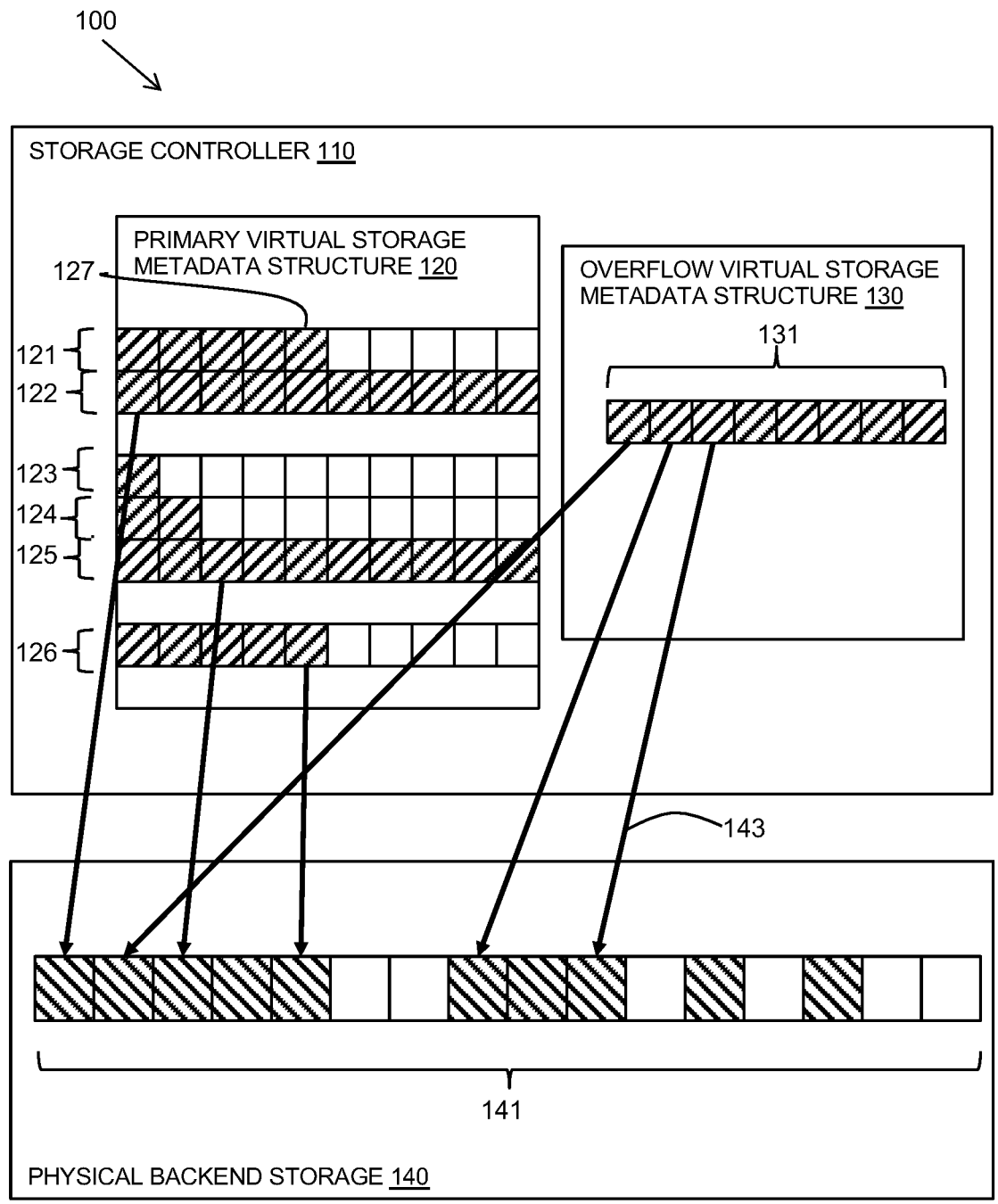
FIG. 1A is a schematic diagram of metadata structures of a virtual storage system, in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the Figures to indicate corresponding or analogous features.

DETAILED DESCRIPTION

Embodiments of the present invention provide stale data recovery, enabling point-in-time versions of storage data, using virtual storage metadata structures. Further, embodiments of the present invention provide a primary virtual storage metadata structure having virtual address areas for a data chunk, each area including a plurality of "N" most recent updates of metadata for the data chunk. The metadata of each update includes a sequence number for the update and a pointer to the physical location of the data. Additionally, embodiments of the present invention provide an overflow metadata structure for multiple virtual address areas and the overflow metadata structure includes updates that have overflowed from the virtual address areas. An oldest update in a full virtual address area of the primary virtual storage metadata structure includes a link to an overflow location.

In one embodiment, the data chunks may be virtual volumes that are implemented via a deduplication using a log structured array (LSA) or a similar mechanism that exploits the data deduplication data structures that are already in place. The primary and overflow virtual storage metadata structures may be deduplication data structures in a virtual storage system. The described method and system utilize an overflow mechanism in the LSA used for retaining deduplication metadata to access to previous versions even after subsequent overwrites.

Providing a sequence number to multiple updates in a primary virtual metadata structure embeds some of the journal into a main metadata structure, so that the structure is managed and used for improved durability of data for host applications, as well as to provide volume versioning features. Embodiments of the present invention also provide another benefit, that the sequence numbers enable point-in-time versions to be created "instantly," by storing the relevant sequence number of the data chunk.

The overflow virtual metadata structure, which is an overflow journal, stores metadata for older, overflowed, updates to the chunks and holds older generations (older than the N generations in the primary metadata), and may utilize this information for recovery of older versions. Embodiments of the present invention can also use overflow virtual metadata structure for space reclamation.

Additional embodiments of the present invention, using the proposed sequence number of generations of updates, can identify particular historical versions of a data chunk, such as a volume, and can associate names and further attributes with labelled historical versions. The labelled historical versions allow a user to associate a name and/or other properties to a point in time, which may be correlated to a sequence number by the storage controller.

Some of the assigned properties of such identified historical versions of a volume may affect the operation of the virtual storage, such as a log structured array. For example, a historical version of a volume may be marked with a retention period to prevent its data areas being garbage collected prior to that period expiring. Such an example enables users to be able to "rewind" a volume to a point(s) from prior period (e.g., in the last 24-hour period, perhaps between daily backups).

Embodiments of the present invention can enable the aforementioned features by having each data chunk in the forward lookup primary metadata structure storing the last N changes but also augmented by an overflow scheme. When an overwrite occurs, the overflow scheme can gradually consume the spaces until completion. At completion, the oldest update will be migrated out. Also, on reads the most recent data chunk will be read.

Referring to FIG. 1A, a schematic diagram 100 shows an example embodiment of virtual data structures used by the described method and system, in accordance with embodiments of the present invention. A storage system includes a storage controller 110 that manages the virtual storage allocation in the virtual domain. In the described system, FIG. 1 includes a primary virtual storage metadata structure 120 and an overflow virtual storage metadata structure 130. The virtual storage metadata points to physical backend storage 140 of the data referred to as the data domain. Management of write locations in the data domain is carried out by a separate mechanism. A most common implementation of the primary virtual storage metadata structures is a tree to allow for a fast lookup; however, other implementations may be provided for the overall metadata structure.

The primary virtual storage metadata structure 120 has virtual address areas in the form of generations rows 121-126 for each data chunk, each area including a plurality of N most recent updates 127 of metadata for the data chunk.

The overflow virtual storage metadata structure 130 is used for overflow from the generations of rows 121, 122, 123, 124, 125, and 126 (i.e., rows 121-126). The overflow metadata structure includes updates 131, which have overflowed from the virtual address rows. The updates 127 in the primary virtual storage metadata structure 120 and the updates 131 in the overflow virtual storage metadata structure 130 point (via arrow 143) to the physical data storage areas 141 in the physical backend storage 140.

In the primary virtual storage metadata structure 120, a most recent generation update 127 is added to the generations row 121 and space is shown in row 121 for additional updates. Rows 122, 125 are shown to be full of updates and therefore new generation updates to these rows will cause an overflow of an oldest update in the row 122, 125 to the overflow virtual storage metadata structure 130.

Figure 1B:
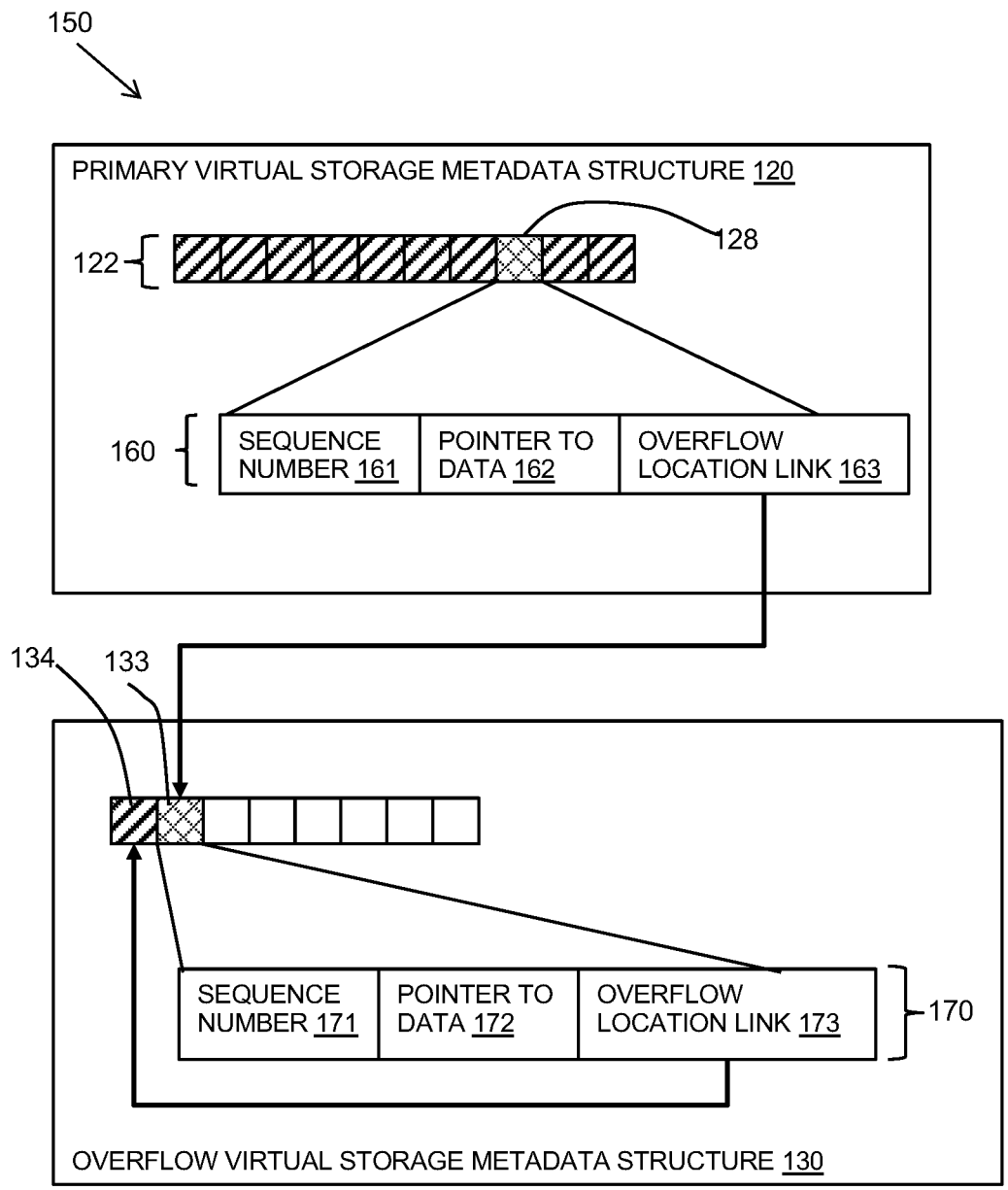
FIG. 1B is a schematic diagram of metadata structures of a virtual storage system, in accordance with embodiments of the present invention.

Referring to FIG. 1B, a schematic diagram 150 shows the metadata update links between the primary virtual storage metadata structure 120 and the overflow virtual storage metadata structure 130, in accordance with embodiments of the present invention. An overflown row 122 of the primary virtual storage metadata structure 120 is shown with an oldest immediately accessible update 128 having metadata 160 including a sequence number 161 and a pointer to the data 162 in the data domain. An oldest update in the row also has metadata of an overflow location link 163 of the previous update 133 that has overflown the row 122. A row may start from position 0 to N, or may be treated as a cyclic buffer and place a newest update in the place of the record that has to be migrated to the overflow area.

Following the overflow location link 163, the location of a previous update 133 is found. The previous update 133 in turn includes metadata 170 including a sequence number 171, a pointer to the data 172 in the data domain, and an overflow location link 173 of the previous update 134 in the overflow.

The sequence number 161 in this example is a global sequence number for simplicity. A global sequence number is a single generation number that is incremented for each update to a volume/system rather than a generation number per-chunk or virtual address. Sequence number allocation can be done at the same granularity as required version consistency. Accordingly, if a volume level consistency is required, then sequence number needs to be increasing at the volume level (and stored at volume level). Also, if a virtual address granularity is enough, then an address-based granularity will suffice. Intermediate levels of allocation of the sequence number are also possible, which presents the option for a trade-off between time to access a historical version, precision of versioned volume correlation, and version memory consumption depending on the concrete application/apparatus.

The sequence number is at the heart of the process, each write will have a new sequence number allocated, which allows the method and system to understand the order of the updates. The sequence number is also used for the purposes of accessing historical versions of the volume.

Figure 2A:
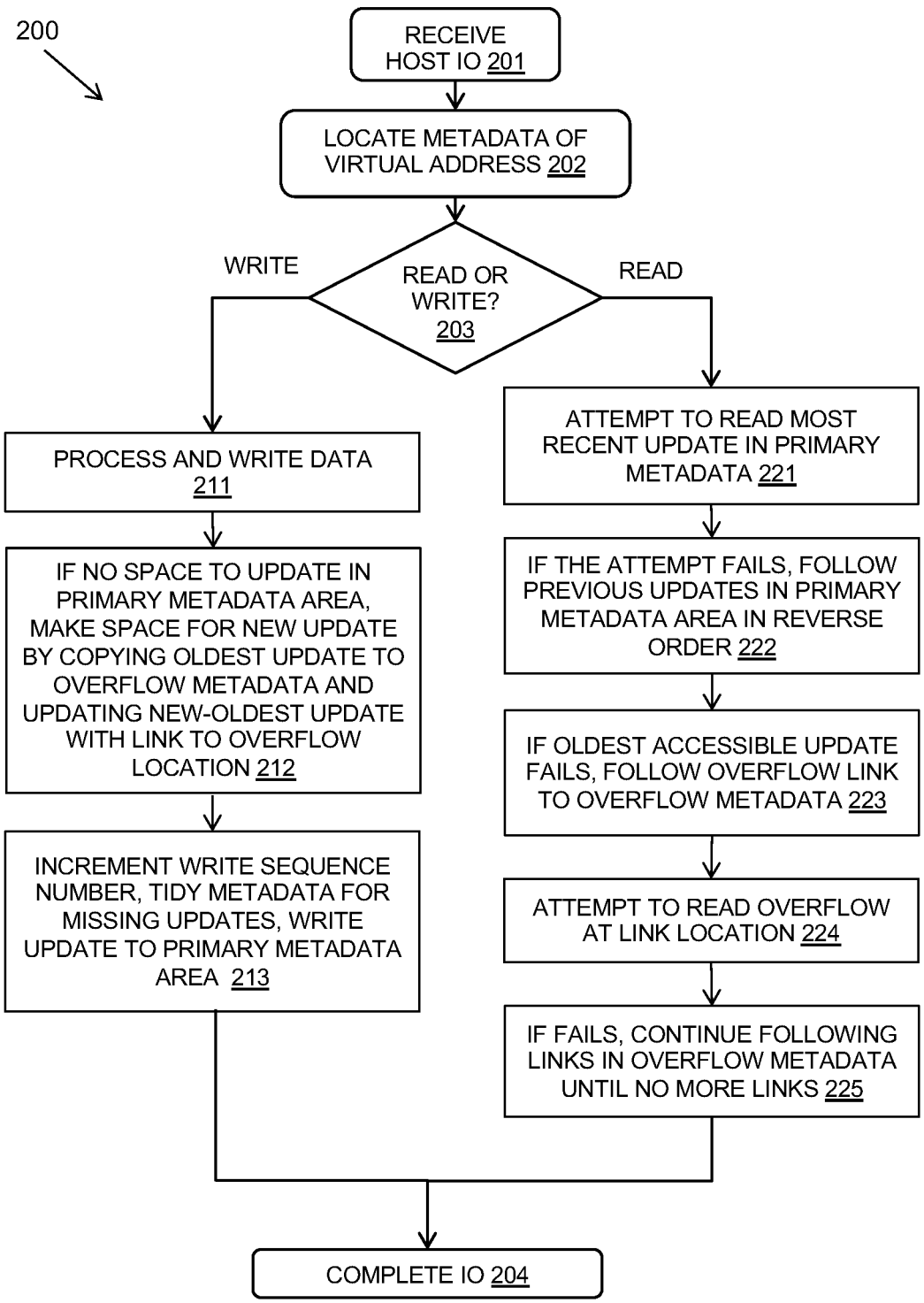
FIG. 2A is a flow diagram of an example embodiment of a method, in accordance with embodiments of the present invention.

Referring to FIG. 2A, a flow diagram 200 shows an example embodiment of the described method as carried out in the virtual domain of a storage system, in accordance with embodiments of the present invention. In step 201, the method of flow diagram 200 receives host input/output operation (IO). In step 202, the method of flow diagram 200 locates the virtual address' metadata. In decision step 203, the method of flow diagram 200 determines whether the received operation is a read operation or a write operation.

In response to determining that the received operation is a write operation (decision step 203, WRITE branch), the method of flow diagram 200 processes the IO and writes the data (step 211). If the primary metadata area does not have space for the data block to add an update, then the method of flow diagram 200 makes space by copying an oldest update in the area to overflow metadata and updating the new-oldest update in the primary metadata area with a link to the overflow location of the overflown update (step 212). If space is available in the primary metadata area for the data block, then the method of flow diagram 200 can skip step 212.

Further, in step 213, the method of flow diagram 200 increments the write sequence number for the data, tidies the metadata for missing updates, and writes the new update to the primary metadata area.

In example embodiments, the method of flow diagram 200 can tidy metadata for missing updates by amending the metadata if a gap exists in the known sequence number. For example, for a missing journal entry, the metadata may be amended with the latest sequence number, which may correct metadata, so the forward lookup metadata does not refer to data that does not exist.

In response to determining that the received operation is a read operation (decision step 203, READ branch), the method of flow diagram 200 attempts to read the most recent update in the primary metadata area for the data block (step 221). If step 221 fails, then the method of flow diagram 200 follows the previous updates in the primary metadata area and attempts the updates in reverse order (step 222).

If the oldest accessible update in the primary metadata fails, then the method of flow diagram 200 follows the overflow link in the oldest update to the overflow metadata location (step 223). In step 224, the method of flow diagram 200 attempts to read the overflow update at the link location and. If step 224 fails, then the method of flow diagram 200 continues by following links to earlier updates in the overflow metadata until no more links are available (step 225). In step 204, for both read and write cases, the IO completes.

Figure 2B:
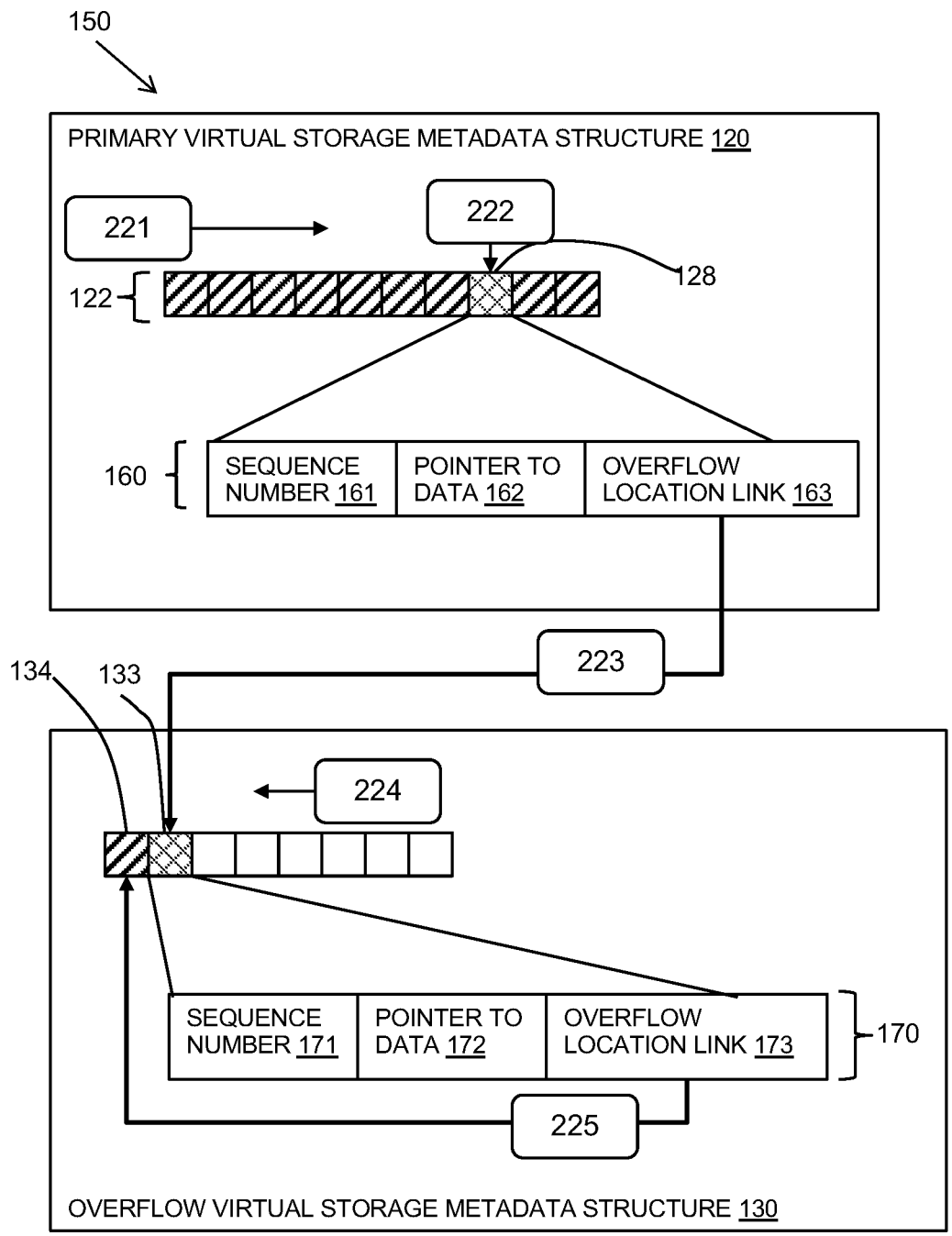
FIG. 2B is a schematic diagram of the metadata structure of FIG. 1B showing the method of FIG. 2A, in accordance with embodiments of the present invention.

Referring to FIG. 2B, the schematic diagram of FIG. 1B is shown with the method steps of the read operation of steps 221-225 depicted in the Figure, in accordance with various embodiments of the present invention. The method attempts to read the update in row 122 of the primary virtual storage metadata structure 120 (in step 221), until the method reads the update that links to update 133 in the overflow virtual storage metadata structure 130 (step 222). The method continues to attempt to read the overflow update (step 224) by following links (step 225).

Figure 3:
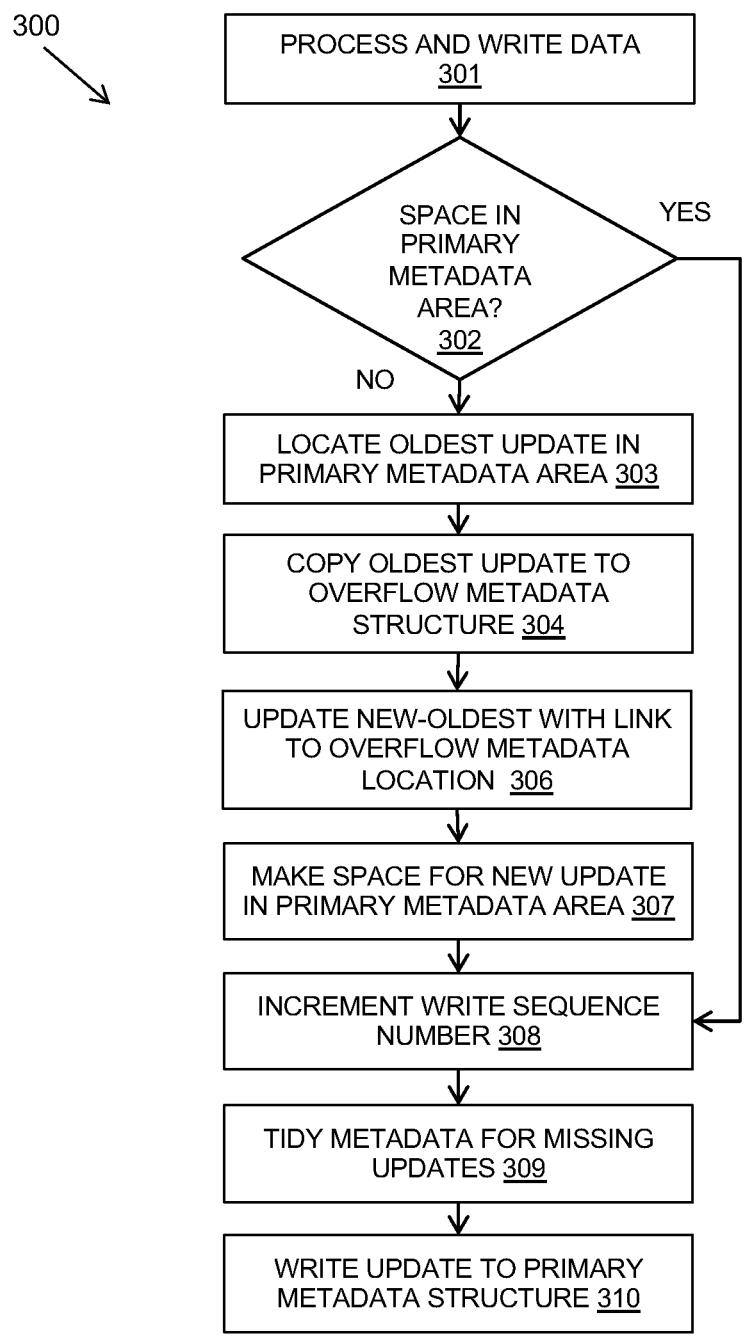
FIG. 3 is a flow diagram of a further example embodiment of an aspect of a method, in accordance with embodiments of the present invention.

Referring to FIG. 3, a flow diagram 300 shows another example embodiment of the write method, in accordance with embodiments of the present invention. In step 301, the method of flow diagram 300 processes a write and writes and the data to a data domain. In decision step 302, the method of flow diagram 300 determines space in the primary metadata area is available for the data chunk of the write in the primary virtual storage metadata structure. In response to determining that space is available, the method of flow diagram 300 increments the write sequence number (step 308). Further, the method of flow diagram 300 tidies metadata of any missing updates (step 309). Additionally, the method of flow diagram 300 writes an update to the primary metadata area (step 310).

In response to determining that space is not available in the primary metadata area (decision step 302, NO branch), the method of flow diagram 300 performs processing to create space using the overflow virtual storage metadata structure. In step 303, the method of flow diagram 300 locates an oldest update in the primary metadata area. Then, the method of flow diagram 300 copies copied the oldest update to the overflow metadata structure (step 304). In step 306, the method of flow diagram 300 updates 1 new-oldest update with a link to the overflow metadata location of the moved previous-oldest update. Accordingly, the method of flow diagram 300 makes space for the new update in the primary metadata area (step 307). The method of flow diagram 300 then proceeds as described above, by incrementing the sequence number (step 308), tidying the metadata of any missing updates (step 309), and writing an update to the primary metadata area (step 310).

Figure 4:
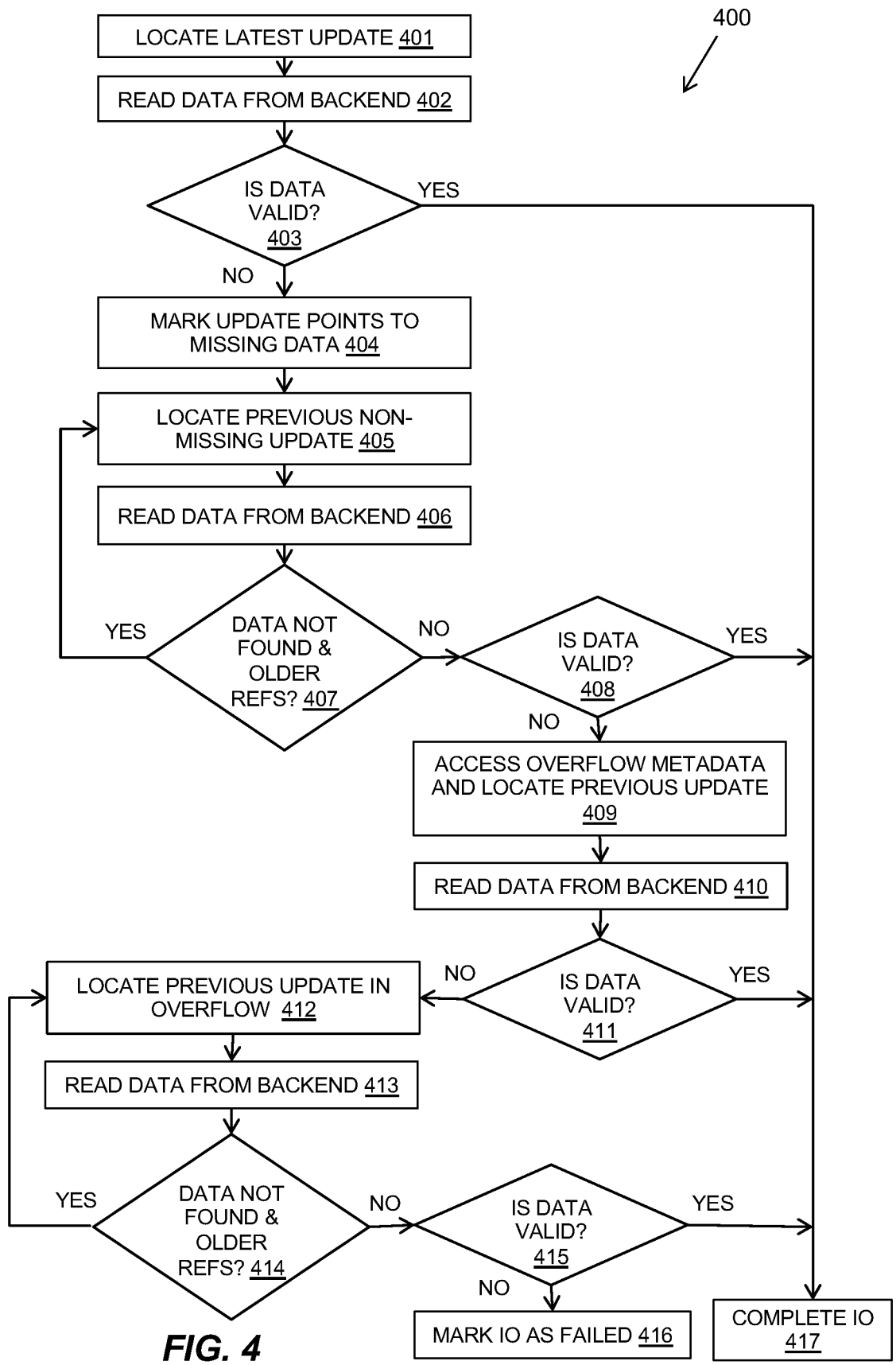
FIG. 4 is a flow diagram of a further example embodiment of an aspect of a method, in accordance with embodiments of the present invention.

Referring to FIG. 4, a flow diagram 400 shows another example embodiment of the read method, in accordance with embodiments of the present invention. In step 401, the method of flow diagram 400 locates a latest update in the primary metadata area for the data block (e.g., for a read operation). In step 402, the method of flow diagram 400 reads data from the backend. In decision step 403, the method of flow diagram 400 determines whether the data is valid. In response to determining that the data is valid (decision step 403, YES branch), the method of flow diagram 400 completes the read (step 417).

In response to determining that the data is not valid (decision step 403, NO branch), the method of flow diagram 400 marks the update as pointing to missing data (step 404). Further, the method of flow diagram 400 then locates a previous non-missing update (in step 405) and reads the data from the backend (in step 406). In decision step 407, the method of flow diagram 400 determines whether the data is not found and if whether any older records are available to try. In response to determining that the data is not found and older records are available (decision step 407, YES branch), the method of flow diagram 400 loops to step 405, to locate previous non-missing updates and then read the data from the backend (in step 406).

In response to determining that the data is found or that older records are not available (decision step 307, NO branch), the method of flow diagram 400 determines (again) whether the data is valid (decision step 408). In response to determining that the data is valid (decision step 408, YES branch), the method of flow diagram 400 completes the read (step 417).

In response to determining that the data is not valid (decision step 408, NO branch), the method of flow diagram 400 access the overflow metadata to locate a previous update (step 409. Then, the method of flow diagram 400 reads the data from the backend (step 410). In decision step 411, the method of flow diagram 400 determines whether the data is valid. In response to determining that the data is valid (decision step 411, YES branch), the method of flow diagram 400 completes the read (step 417).

In response to determining that the data is not valid (decision step 411, NO branch), the method of flow diagram 400 locates a previous update in the overflow (step 412) and reads the data from the backend (step 413). In decision step 414, the method of flow diagram 400 determines whether the data is not found and if any older records are available to try in the overflow metadata. In response to determining that the data is not found, and older records are available (decision step 414, YES branch), the method of flow diagram 400 loops to step 412 to locate previous updates in the overflow metadata. Then, the method of flow diagram 400 can read the data from the backend (step 413). In response to determining that the data is found or that older records are not available (decision step 414, NO branch), the method of flow diagram 400 (again) determines whether the data is valid (decision step 415).

In response to determining that the data is valid (decision step 415, YES branch), the method of flow diagram 400 completes the read (step 417). In response to determining that the data is not valid (decision step 415, NO branch), the method of flow diagram 400 marks the IO as failed (step 416).

The described method and system may exploit existing deduplication overflows in virtual storage by using the overflows independently from deduplication. Accordingly, the method and system provide a highly efficient way to retain access to previous versions of the data and a means to exploit this to create significant beneficial features for the customer.

The read process, as depicted in the above flow, allows the system to fall back to older versions of the data (e.g., stale data). Returning stale data is not desired by applications under normal circumstances; however, in case of backend data loss, the process often produces better results than simply failing the IO. Accordingly, embodiments of the present invention recognize that returning stale data may be a behavior preferred by customers for certain volumes. The stale data may be used for automatically patching over media errors for data chunks where this is appropriate using overflow techniques in an LSA journal.

The described metadata data structures and methods allow the retrieval of older, point-in-time, versions of a whole data chunk, such as a volume, by storing the associated sequence number of the write and without using additional backend storage. Reads directed to previous versions of a data chunk will consider the active sequence number for that version and fall back until reaching an update that is equal or less than this value. Accordingly, logically collating previous versions of data at a data chunk level allows continued access to historical point-in-time 'as-was' versions of data chunks.

These "as-was" versions of the data can be viewed even in the presence of subsequent overwrites. The state of a volume at a point in time can have many uses from an application or user point of view but is also useful for storage administration. For example, a volume may be rolled-back to a point in time where integrity was not in doubt or to the exact start time of a journal which can be replayed onto of the data as it was at the time just prior to the first record in the journal was written.

Another benefit is that space reclamation is performed on the overflow virtual storage metadata structure, being read from oldest to newest overflow. Effectively, everything pointed at by the overflow metadata can be reclaimed, but the presence of the overflow allows this process to be less bound to host IO while still typically retaining at least N oldest updates for each virtual address for the purposes of data recovery.

The scheme to store N previous version of data may be built upon. For example, to retain metadata for writes that are associated with a sequence number that is greater than the sequence number associated with a particular point in time. For example, this could be a moving point in time, such as continuously for a duration of time previously, for example "for-one-week," "for-one-day," or this point in time could move in jumps such as "since-the-last-backup," "since-midnight," and so on. The garbage collection of such older version of data can take into account any attributes of labelled versions such as retention policy related attributes.

A clear advantage of using the overflow as the source for space reclamation input is that the process can be less reactive and more proactive in terms of what areas are better candidates for reclamation, what is the rate of reclamation, and dictated by the space pressure on the system.

Deduplication often uses a technique called "overflows" where a chunk that has references is being overwritten, the owning metadata structure is retained. This allows the structure to avoid rehoming the data and to maintain back-references more efficiently. Such existing deduplication overflows may be used for the described overflow virtual storage metadata structure. It should be noted that in the context of deduplicated storage, storing "previous" version of deduplicated data is frequently storing data that is still current for the other references to the previous version of the data, so does not necessarily incur a large space penalty.

The advantage of the described method and system is in embedding some of the journal information into the main metadata structure and in the way it is managed and used for improved durability of data for host applications as well as the way this is utilized to provide the useful volume versioning features.

Figure 5:
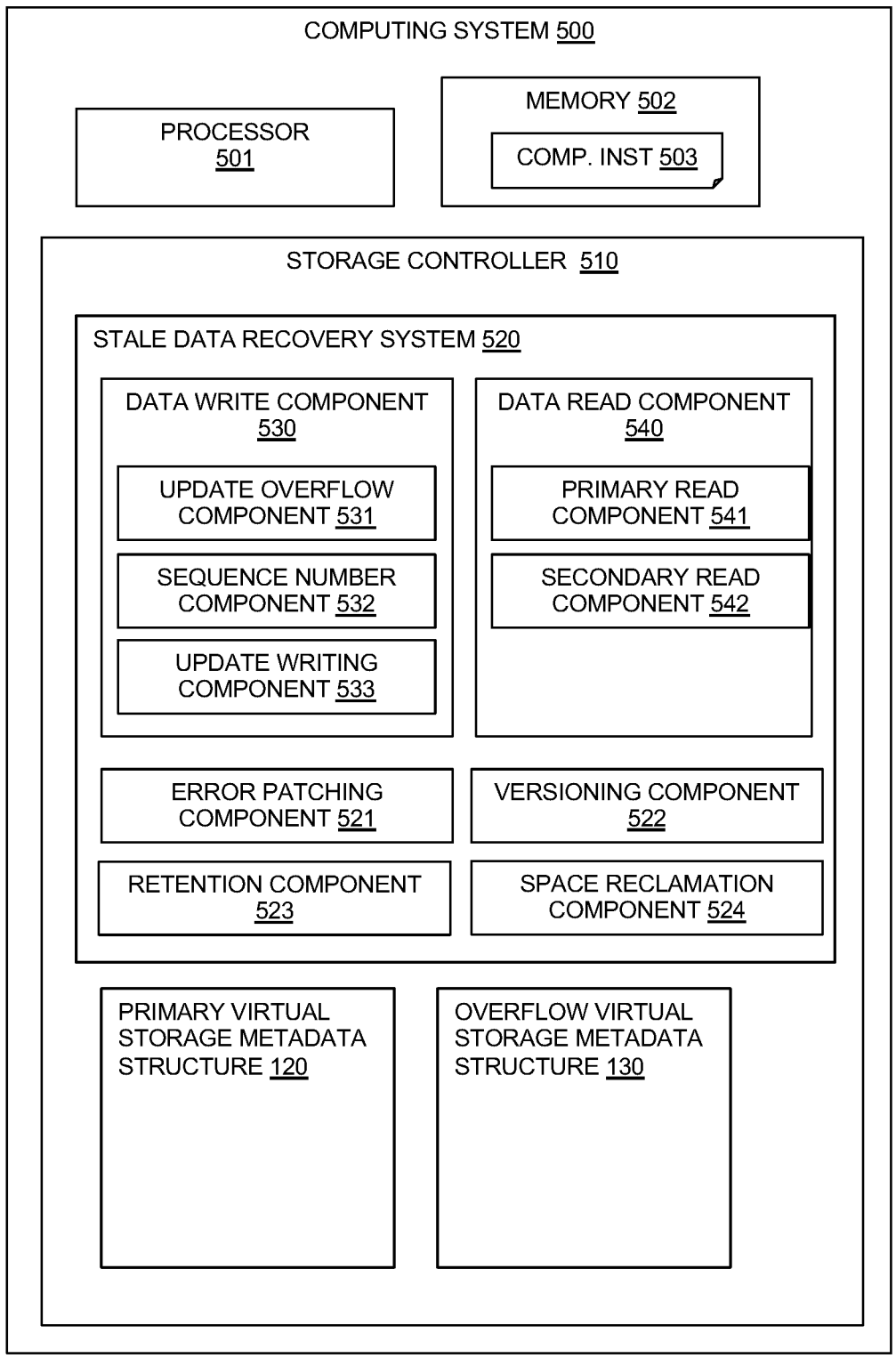
FIG. 5 is block diagram of an example embodiment of a system, in accordance with embodiments of the present invention.

Referring to FIG. 5, a block diagram shows a computing system 500 providing a storage controller 510 for a storage system, in accordance with embodiments of the present invention. In various embodiments, computing system 500 is a system that is capable of performing processing steps of flow diagram 200 (depicted in FIG. 2A), flow diagram 300 (depicted in FIG. 3), and flow diagram 400 (depicted in FIG. 4), in accordance with embodiments of the present invention The computing system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The storage controller 510 includes a stale data recovery system 520 that uses a primary virtual storage metadata structure 120 having virtual address areas for a data chunk, each area including a plurality of most recent updates of metadata for the data chunk, with the metadata of each update includes a sequence number for the update and a pointer to the physical location of the data and an overflow virtual storage metadata structure 130 for multiple virtual address areas, with the overflow metadata structure including updates that have overflowed from the virtual address areas.

The stale data recovery system 520 includes a data write component 530 for processing a data write and updating the metadata for a data chunk including: an update overflow component 531 for, if no space is available in a virtual address area of the primary virtual storage metadata structure, copying an oldest update to a location in the overflow virtual storage metadata structure and adding the link of the overflow location to the new-oldest update in the virtual address area to make space in the virtual address area; a sequence number component 532 for incrementing a sequence number; and an update writing component 533 for writing the new update to the virtual address area.

The stale data recovery system 520 includes a data read component 540 for processing a data read and updating the metadata for a data chunk including: a primary read component 541 for attempting to read updates in a virtual address area from a most recent update to an oldest, reading a next oldest if an update read fails; and an overflow read component 542 for, if reading the oldest update in virtual address area fails, following the link to the overflow location and attempting to read updates in the overflow virtual storage metadata structure and following links if an update read fails.

The stale data recovery system 520 includes an error patching component 521 for reading older updates returns stale data that is used for automatically patching over errors in data chunks.

The stale data recovery system 520 includes a versioning component 522 for processing a read directed to a previous version of a data chunk by considering an active sequence number for the version and falling back on updates until reaching an update that is equal or less than the active sequence number for that version.

The stale data recovery system 520 includes a retention component 523 for providing a retention period for writes of a data chunk by allocating a retention sequence number and retaining updates for writes that are associated with a sequence number that is greater than the sequence number associated with a point in time. The stale data recovery system 520 also includes a space reclamation component 524 for using the overflow virtual storage metadata structure for controlled space reclamation taking account of attributes of labelled versions.

Figure 6:
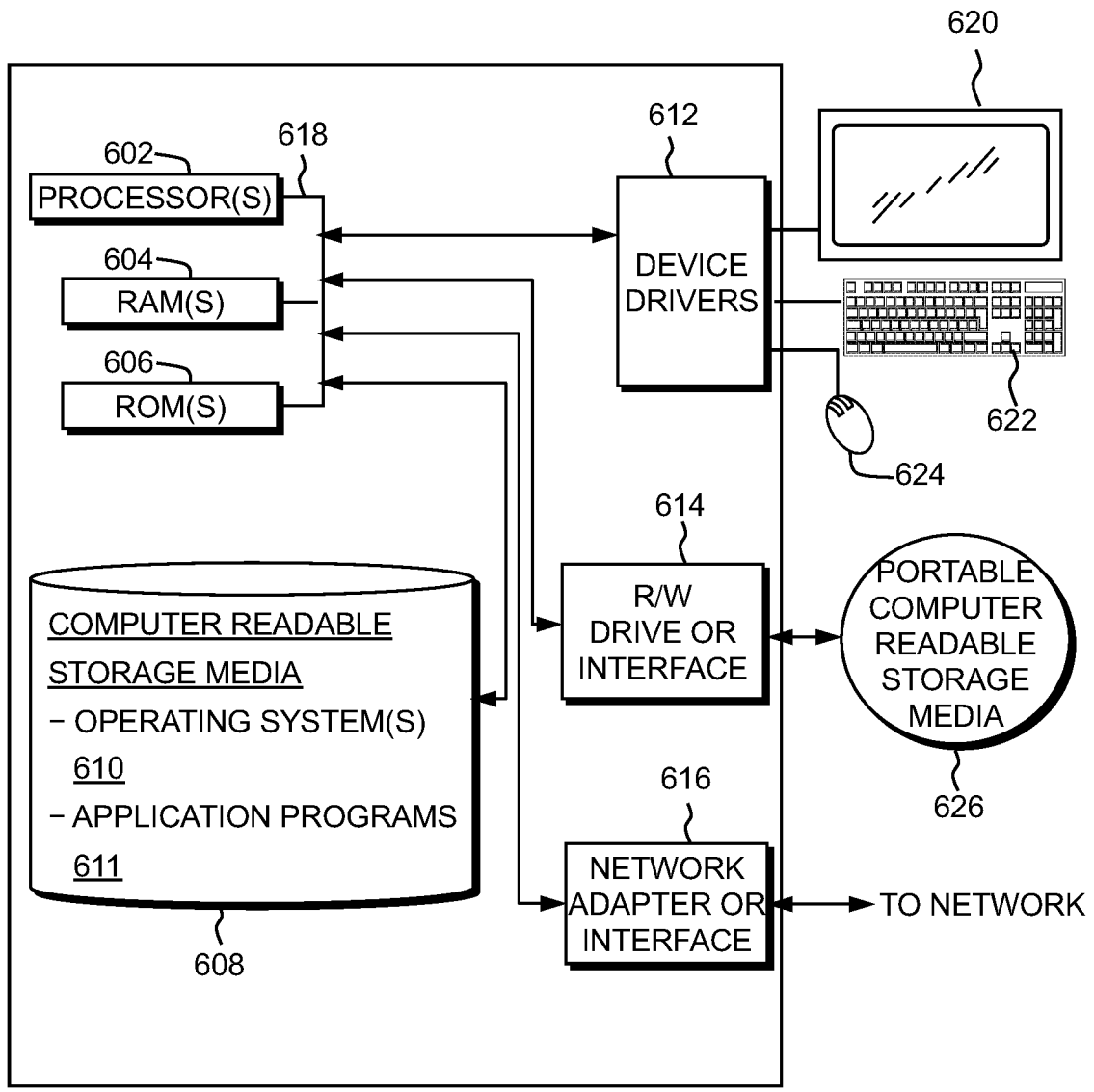
FIG. 6 is a block diagram of an embodiment of a computer system or cloud server in which various embodiments of the present invention may be implemented.

FIG. 6 depicts a block diagram of components of the computing system 500 of storage controller 510 of FIG. 5, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing system 500 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the stale data recovery system 520 are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 500 can also include a R/W drive or interface 614 to read from and write to one or more portable computer readable storage media 626. Application programs 611 on computing system 500 can be stored on one or more of the portable computer readable storage media 626, read via the respective R/W drive or interface 614 and loaded into the respective computer readable storage media 608.

Computing system 500 can also include a network adapter or interface 616, such as a TCP/IP adapter card or wireless communication adapter. Application programs 611 on computing system 500 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing system 500 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
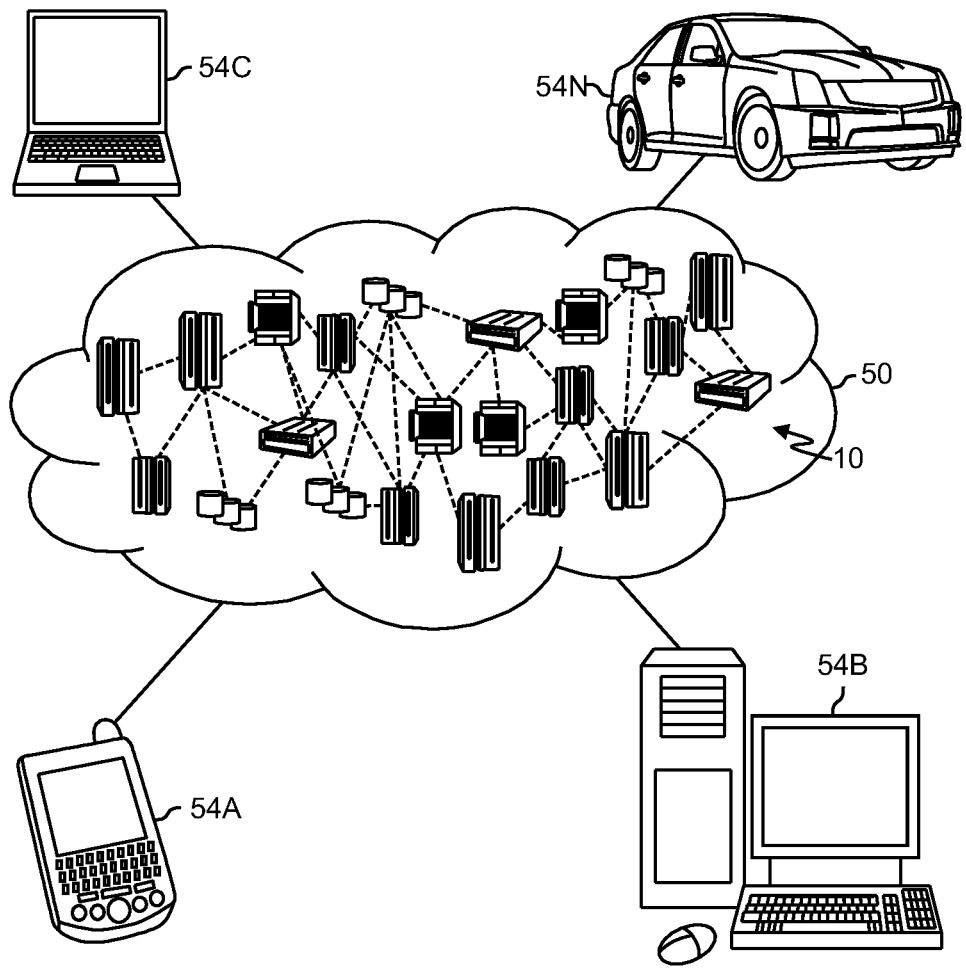
FIG. 7 is a schematic diagram of a cloud computing environment in which various embodiments of the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
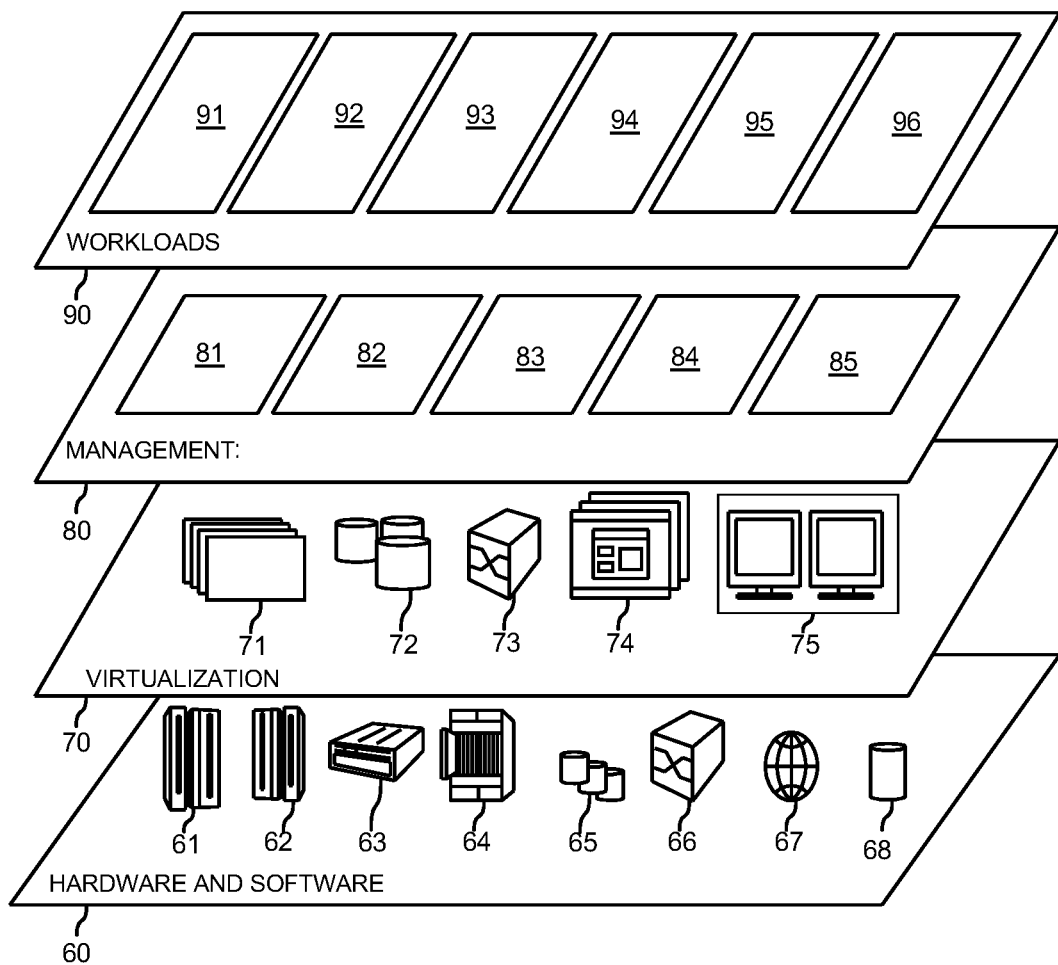
FIG. 8 is a diagram of abstraction model layers of a cloud computing environment in which various embodiments of the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system controller processing 96. In various embodiments, storage system controller processing 96 is capable of performing processing steps of flow diagram 200 (depicted in FIG. 2A), flow diagram 300 (depicted in FIG. 3), and flow diagram 400 (depicted in FIG. 4), in accordance with embodiments of the present invention.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
generating, by one or more processors, a primary virtual storage metadata structure having primary virtual address areas, wherein a data chunk in each primary virtual address area is implemented via a mechanism that exploits data deduplication data structures for i) the data chunk and ii) a plurality of most recent updates of metadata for the data chunk, wherein respective metadata of each update includes a sequence number incremented for each update and a pointer to a respective physical location of the data chunk; and
generating, by one or more processors, an overflow virtual storage metadata structure that may be data deduplication data structures for the primary virtual address areas, wherein the overflow virtual storage metadata structure includes overflow updates that have overflowed from the primary virtual address areas, wherein each overflow update comprises a sequence number incremented for each overflow update and a pointer to a respective physical location of the data chunk, and wherein the overflow virtual storage metadata structure may be a deduplication data structure, and where space reclamation is performed on the overflow virtual storage metadata structure by reading each overflow update from oldest to newest and without bounding a host input/output;
wherein an oldest update in a full primary virtual address area includes a link to an overflow location in the overflow virtual storage metadata structure.

2. The method as claimed in claim 1, further comprising:
maintaining, by one or more processors, previously overflowed updates in the overflow virtual storage metadata structure until the previously overflowed updates migrate out, with newer overflowed updates linking to older overflowed updates.

3. The method as claimed in claim 1, wherein a sequence number allocation is at a data chunk granularity of required version consistency between a volume level and a virtual address level.

4. The method as claimed in claim 1, further comprising:
processing, by one or more processors, a data write and updating the metadata for the data chunk, the processing including:
in response to determining that a first primary virtual address area does not include available space, copying, by one or more processors, an oldest update to a location in the overflow virtual storage metadata structure and adding the link to a new- oldest update in the first primary virtual address area to make space in the first primary virtual address area; and
incrementing, by one or more processors, the sequence number and writing the new update to the first primary virtual address area.

5. The method as claimed in claim 1, further comprising:
processing, by one or more processors, a data read and updating the metadata for a data chunk, the processing including:
attempting, by one or more processors, to read updates in a virtual address area from a most recent update to an oldest, reading a next oldest if an update read fails; and
subsequent to the oldest update in virtual address area failing, following the link to the overflow location and attempting to read updates in the overflow virtual storage metadata structure and following links if an update read fails.

6. The method as claimed in claim 1, wherein reading older updates returns stale data, and further comprising:
automatically patching, by one or more processors, over errors in data chunks utilizing the returned stale data.

7. The method as claimed in claim 1, further comprising:
processing, by one or more processors, a read directed to a previous version of a data chunk by considering an active sequence number for the version and falling back on updates until reaching an update that is equal or less than the active sequence number for the version.

8. The method as claimed in claim 1, further comprising:
providing, by one or more processors, a retention period for writes of a data chunk by allocating a retention sequence number and retaining updates for writes that are associated with a sequence number that is greater than the respective sequence number associated with a point in time.

9. The method as claimed in claim 1, wherein the overflow virtual storage metadata structure is used for controlled space reclamation taking account of attributes of labelled versions.

10. A computer program product comprising:
one or more computer readable storage media and program instructions stored on the one or more computer readable storage media, the program instructions comprising:
program instructions to generate a primary virtual storage metadata structure having primary virtual address areas, wherein a data chunk in each primary virtual address area is implemented via a mechanism that exploits data deduplication data structures for i) the data chunk and ii) a plurality of most recent updates of metadata for the data chunk, wherein respective metadata of each update includes a sequence number incremented for each update and a pointer to a respective physical location of the data chunk; and
program instructions to generate an overflow virtual storage metadata structure that may be data deduplication data structures for the primary virtual address areas, wherein the overflow virtual storage metadata structure includes overflow updates that have overflowed from the primary virtual address areas, wherein each overflow update comprises a sequence number incremented for each overflow update and a pointer to a respective physical location of the data chunk, and wherein the overflow virtual storage metadata structure may be a deduplication data structure, and where space reclamation is performed on the overflow virtual storage metadata structure by reading each overflow update from oldest to newest and without bounding a host input/output;

wherein an oldest update in a full virtual address area of the primary virtual storage metadata structure includes a link to an overflow location in the overflow virtual storage metadata structure.

11. The computer program product of claim 10, further comprising program instructions, stored on the one or more computer readable storage media, to:

maintain previously overflowed updates in the overflow virtual storage metadata structure until the previously overflowed updates migrate out, with newer overflowed updates linking to older overflowed updates.

12. The computer program product of claim 10, wherein a sequence number allocation is at a data chunk granularity of required version consistency between a volume level and a virtual address level.

13. The computer program product of claim 10, further comprising program instructions, stored on the one or more computer readable storage media, to:

process a data write and updating the metadata for the data chunk, the processing including:

in response to determining that a first primary virtual address area does not include available space, copy an oldest update to a location in the overflow virtual storage metadata structure and adding the link to a new-oldest update in the first primary virtual address area to make space in the first primary virtual address area; and increment the sequence number and writing the new update to the first primary virtual address area.

14. A computer system comprising:

one or more computer processors;

one or more computer readable storage media; and program instructions stored on the computer readable storage media for execution by at least one of the one or more processors, the program instructions comprising:

program instructions to generate a primary virtual storage metadata structure having primary virtual address areas, wherein a data chunk in each primary virtual address area is implemented via a mechanism that exploits data deduplication data structures for i) the data chunk and ii) a plurality of most recent updates of metadata for the data chunk, wherein respective metadata of each update includes a sequence number incremented for each update and a pointer to a respective physical location of the data chunk; and program instructions to generate an overflow virtual storage metadata structure that may be data deduplication data structures for the primary virtual address areas, wherein the overflow virtual storage metadata structure includes overflow updates that have overflowed from the primary virtual address areas, wherein each overflow update comprises a sequence number incremented for each overflow update and a pointer to a respective physical location of the data chunk, and wherein the overflow virtual storage metadata structure may be a deduplication data structure, and where space reclamation is performed on the overflow virtual storage metadata structure by reading each overflow update from oldest to newest and without bounding a host input/output;

wherein an oldest update in a full virtual address area of the primary virtual storage metadata structure includes a link to an overflow location in the overflow virtual storage metadata structure.

15. The computer system of claim 14, further comprising program instructions, stored on the computer readable storage media for execution by at least one of the one or more processors, to:

maintain previously overflowed updates in the overflow virtual storage metadata structure until the previously overflowed updates migrate out, with newer overflowed updates linking to older overflowed updates.

16. The computer system of claim 14, wherein a sequence number allocation is at a data chunk granularity of required version consistency between a volume level and a virtual address level.

17. The computer system of claim 14, further comprising program instructions, stored on the computer readable storage media for execution by at least one of the one or more processors, to:

process a data write and updating the metadata for the data chunk, the processing including:

in response to determining that a first primary virtual address area does not include available space, copy an oldest update to a location in the overflow virtual storage metadata structure and adding the link to a new-oldest update in the virtual address area to make space in the first primary virtual address area; and increment the sequence number and writing the new update to the first primary virtual address area.

18. The computer system of claim 14, further comprising program instructions, stored on the computer readable storage media for execution by at least one of the one or more processors, to:

process a data read and updating the metadata for a data chunk, the processing including:

attempting to read updates in a virtual address area from a most recent update to an oldest, reading a next oldest if an update read fails; and if reading the oldest update in virtual address area fails, following the link to the overflow location and attempting to read updates in the overflow virtual storage metadata structure and following links if an update read fails.

19. The computer system of claim 14, further comprising program instructions, stored on the computer readable storage media for execution by at least one of the one or more processors, to:

process a read directed to a previous version of a data chunk by considering an active sequence number for the version and falling back on updates until reaching an update that is equal or less than the active sequence number for the version.

20. The computer system of claim 14, further comprising program instructions, stored on the computer readable storage media for execution by at least one of the one or more processors, to:

provide a retention period for writes of a data chunk by allocating a retention sequence number and retaining updates for writes that are associated with a sequence number that is greater than the respective sequence number associated with a point in time.

* * * * *